May 31, 1966     H. E. REUSSER     3,253,631

COLD-FORMED SELF-PIERCING NUT

Filed June 17, 1963

INVENTOR

HANS E. REUSSER

BY Emery L. Groff Jr.

ATTORNEY

United States Patent Office 3,253,631
Patented May 31, 1966

3,253,631
COLD-FORMED SELF-PIERCING NUT
Hans E. Reusser, Cleveland, Ohio, assignor to Republic Steel Corporation, Cleveland, Ohio, a corporation of New Jersey
Filed June 17, 1963, Ser. No. 288,300
3 Claims. (Cl. 151—41.73)

This invention relates to self-piercing and clinching nuts of the type adapted to be mounted upon and through a sheet metal panel and the method of securing such nuts to the panel.

In recent years, self-piercing and clinching nuts have become quite popular in the automotive and appliance industries where there is a large demand for positive and efficient means for making screw fastenings to relatively thin sheet metal components, with access often available only to the attaching side.

The present invention resides in an improved self-piercing and clinching nut which is attached to a metal panel in a one-stroke operation, wherein the nut pierces a round opening through the metal panel while a cooperating piercing die on the underside of the panel concurrently clinches the nut in place by displacing a portion of the panel metal into a specially contoured undercut recess formed in the nut.

Self-piercing and clinching nuts adapted to be mounted upon a metal panel in a one-stroke operation have been available for some time; however, the nut of this application provides improvements not heretofore available in this field.

In the past, it has been found that the most practical means for insuring a positive clinching of the nut and preventing axial movement was to utilize a nut in the form of a square or rectangular blank, as such a nut mounted through a hole of corresponding shape naturally provided the maximum security against rotary displacement of the clinched nut. However, such means usually required complicated tooling for assembling the nut due to the requirement of exact rotary orientation between the rectangular or polygonal nut and the corresponding or mating edges of the opening of the piercing die. Such a piercing die, requiring a far greater degree of accuracy, is much more costly to produce than a piercing die which is entirely circular in form, as in the present invention. In many of the prior devices where the piercing section of the nut is rectangular, the nut is usually clinched to the panel along only two sides of the piercing section, in contrast with the instant arrangement which provides an uninterrupted circular clinching to insure an inherently more positive and fluid-tight connection. The present construction precludes the necessity of providing for rotary orientation between the nut and piercing die, it being necessary only to insure axial alignment. To prevent the possibility of rotary displacement of the nut subsequent to attachment to the panel, locking means are provided integral with the contoured undercut recess formed in the nut.

Many of the present self-piercing and clinching nuts rely upon deformation of a portion of the nut subsequent to piercing through the sheet, for the necessary clinching action.

In the subject invention, however, there is no deformation of the nut during its application to a metal panel. The present nut includes a central piercing portion which projects beyond the plane of the outer bearing rim by an amount which is no greater than the thickness of any panel upon which the nut is to be applied. As a result of this construction, it will be seen that a flush-mounted assembly is provided wherein the central piercing portion of the nut never projects out beyond the outer surface of the panel to which it is applied. This flush mounting eliminates the requirement for additional embossment of the panel beyond the periphery of the nut, a step required to offset protruding portions of the nut in so many of the known self-piercing and clinching nut assemblies. In addition, sharp piercing edges are provided on both the nut and die to insure a true shearing action when the nut is applied to the panel in order to prevent pinching and tearing of the panel material, a condition prevalent with many of the present self-piercing nuts and a cause of rapid deterioration of the piercing die.

A further improvement resides in the ability to utilize panel material having a wide range of thickness and still achieve a flush mounting without the necessity of changing the piercing die as the panel thickness is varied. There is no undesirable variation in the deformation and flow of the panel material during clinching with the result that a superior degree of clinch retention strength is obtained when even the minimum acceptable thickness of panel material is used. This clinch retention strength increases as the panel thickness increases and with the present nut, the ratio between the minimum and maximum acceptable panel thickness is greater than 2:1. Prior known forms of flush mounting self-piercing and clinching nuts have been found to have several limitations, such as: a narrower applicable range of panel thickness; fragile, piercing die extensions for extruding panel material that bind during the assembly operation; and die staking or other deformation to portions of the nut which is of greater hardness than the panel material; with resultant extreme wear and binding of the piercing die during assembly.

The nut blank of the present invention is readily adaptable to high production fabrication by common multi-stage axial-pressure cold-forming methods. The circular undercut recess portion of the nut for receiving the panel during clinching is formed in the sequence of these methods by upsetting the extended piercing portion of the nut radially and outwardly under axial pressure. By utilizing selected material, adequate work-hardness is imparted to the nut blank by these methods to prevent it from being deformed during the piercing and clinching operation. Although a conventional hexagonal perimeter nut form is preferable for high-speed thread tapping methods, the outer shape of the nut blank has no significance with respect to the instant basic invention, said shape often being governed by other considerations such as the type of automatic feeding apparatus being used and its specific means for gripping and centering the nut externally.

Accordingly, one of the objects of the present invention is to provide a self-piercing and clinching nut adapted to be mounted upon a metal panel in a one-stroke punching operation.

Another object of this invention is to provide a self-piercing and clinching nut which will present a flush or non-protruding surface on the face of a metal panel when mounted therethrough.

A further object of the invention is to provide a self-piercing and clinching nut which, during assembly upon a metal panel, causes an improved flow of the adjacent panel material to bring about a more thorough locking between the two members.

Still another object of the invention is to provide a self-piercing and clinching nut having an outwardly projecting piercing edge and a recess therebeneath including locking means to prevent axial displacement between the nut and panel.

A further object of the invention is to provide a simple and efficient method of securing a self-piercing and clinching nut to a metal panel by a one-step punching operation wherein the nut is flush mounted relative to the plane of the panel.

With these and other objects in view which will more readily appear as the nature of the invention is better understood, the invention consists in the novel construction, combination, and arrangement of parts, hereinafter more fully described, illustrated, and claimed.

A preferred and practical embodiment of the invention is shown in the accompanying drawing, in which.

Similar reference characters designate corresponding parts throughout the several figures of the drawing.

Figure 1:
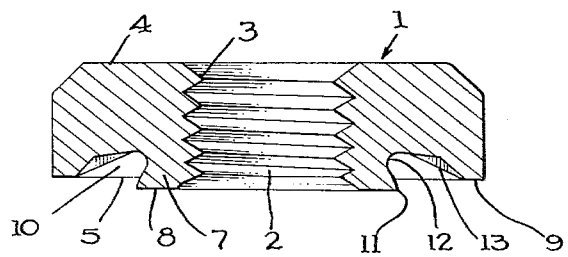
FIGURE 1 is a vertical section through a nut constructed according to the present invention.

Referring now to the drawing, the self-piercing and clinching nut comprises a nut blank designated generally as 1 which is preferably cold-formed. The blank is provided with an axial bore 2 having suitable threads 3 formed therein for receiving an appropriate screw-type fastener element (not shown).

Figure 2:
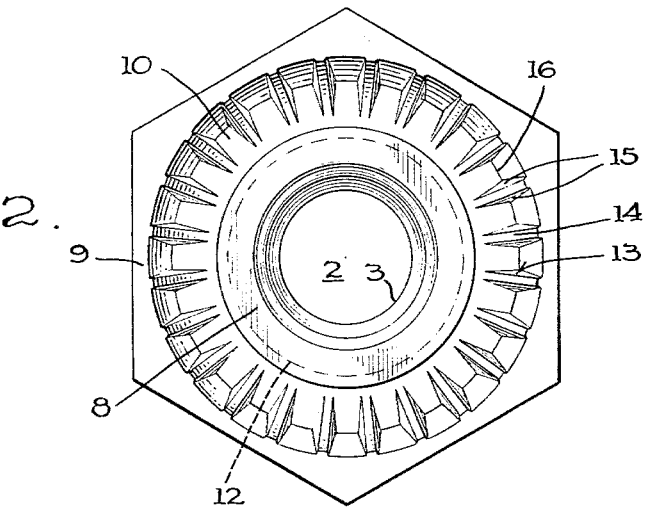
FIGURE 2 is a bottom plan view of the nut illustrating the radial locking ribs.

The rear or top face 4 of the nut is of conventional construction, while the opposite front or attaching face 5 is particularly adapted for mounting upon the face of a sheet metal panel 6. Preferably, the outer perimeter of the nut blank is of hexagonal shape as illustrated in FIGURE 2; however, the shape of the perimeter has no bearing upon the present invention.

The attaching face 5 is provided with an extended circular piercing rim 7 concentric with the bore 2 and immediately adjacent thereto. The face 8 of the piercing rim 7 extends outwardly a critical distance beyond the plane of the front bearing surface 9 of the attaching face. Concentric with the piercing rim 7 is a circular locking recess 10 formed in the attaching face 5 and extending from the outer perimeter of the rim 7 to the inner edge of the bearing surface 9. It will be noted that the recess 10 extends radially inwardly beneath the outermost piercing edge 11 of the rim 7 to provide an undercut portion 12 defining the limits of the neck portion of the piercing rim 7.

As previously mentioned, the plane of the face 8 projects outwardly from the plane of surface 9 a distance which is less than the thickness of the thinnest sheet panel to be used. This insures that the bearing surface 9 will engage the upper surface 6 of the panel before the piercing edge 11 immerges from the underside of the panel. By this means, several advantages are achieved, namely: better flow of the panel metal; a cleaner edge on the hole; less distortion of the panel; and a resultant flush-mounted nut.

A plurality of radially extending locking ribs 13 are formed in the base of the locking recess 10. These ribs 13 extend angularly from the inner circumference of the bearing surface 9 to a point short of the undercut portion 12.

As shown in FIGURE 2, the ribs 13 each include a flat downwardly projecting top surface 14, and a pair of diverging side walls 15 directed outwardly to the base of the recess 10. A plurality of depressions forming locking areas 16 are thus obtained between each pair of ribs 13. Said areas 16 preferably occupy more space than the volume of the ribs themselves as clearly indicated in FIGURE 2.

Figures 3, 4:
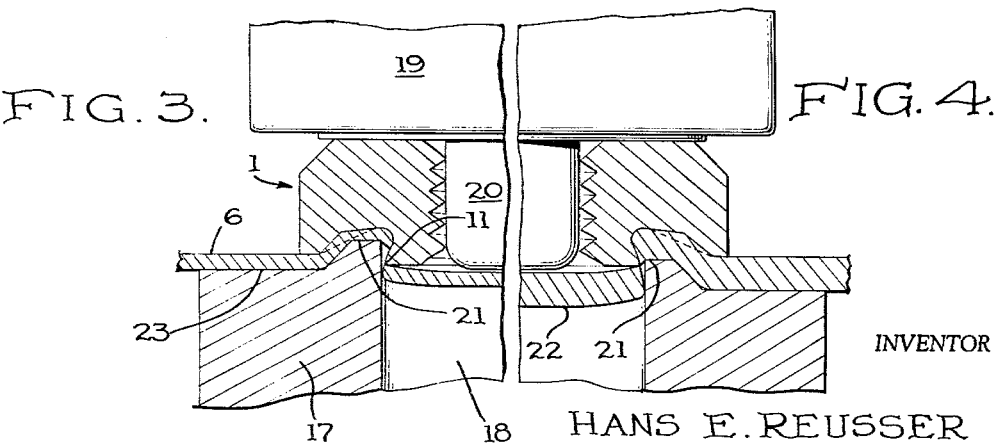
FIGURE 3 is a side elevation, partly in section, showing the nut of the invention being mounted through a metal panel by means of a punch and die.
FIGURE 4 is a side elevation partly in section similar to FIGURE 3 and illustrating the mounting of the nut of the invention through a metal panel of greater thickness.

Referring now more particularly to FIGURE 3, the adaptation of the above described construction will now become readily apparent in the application of the nut to a sheet metal panel 6. The panel 6 is placed over a piercing die 17 having a central aperture 18 which is centered around the desired location of the intended fastening element. The self-piercing and clinching nut is picked up by a punch 19 having a pilot member 20, which is inserted in the axial bore 2 of the nut. As downward pressure is applied by the punch 19, it will be seen that the nut 1 will bear upon the top surface of the panel 6, which is supported by the fixed piercing die 17. As will be noted, the piercing die 17 is provided with an upwardly extending raised rim 21 adjacent the central aperture 18 thereof. The inner diameter of said aperture, and thus also, said raised rim, is slightly larger than the outer diameter of the piercing edge 11 of the nut, so that when the punch 19 forces the nut blank down against the panel 6, it will be seen that the edge 11 of the piercing rim 7 will cut through the panel 6 thereby knocking the resultant slug 22 therefrom through the aperture 18 in the piercing die. Again, it is pointed out that the bearing surface 9 of the nut engaged the upper surface of the sheet before the edge 11 had pierced the sheet.

Continued pressure upon the nut 1 causes the raised rim 21 to force the sheet metal surrounding the hole in the panel up into the locking recess 10. As the bearing surface 9 of the nut retains the metal panel upon the lower surface 23 of the piercing die 17, the raised rim 21 causes the sheet panel to flow not only into the locking areas 16 between the locking ribs 13, but also to flow laterally into the undercut portion 12 of the recess. In other words, the ribbed area of the locking recess 10 serves as a coining die with enough squeezing action to cause inward flow of the metal and reduction of the diameter of the pierced panel opening.

It will be understood that the punch 19 is illustrated in more or less its simplest form. It could take on many forms, including a punch provided with retaining fingers for the nut as in an automatic machine.

Thus, it will be seen that the foregoing reduction is used to retain the nut by clinching the metal into the neck portion. Due to the undercut nature of the neck portion, which receives flowed metal displaced inwardly due to the presence of the ribs 13, the nut is retained against axial movement, while the metal forced into the locking areas 16 prevents any rotary movement of the nut.

I claim:

1. A self-piercing and clinching nut adapted to be flush-mounted through a metal panel, comprising, a polygonal blank non-deformable during application to said panel and having a rear face and an opposite front attaching face and provided with an axial bore, said attaching face including a bearing surface adjacent the periphery thereof and a circular piercing edge spaced radially inwardly of said surface, an axially extending circular recess within said attaching face between said piercing edge and bearing surface, said piercing edge axially extending outwardly beyond the plane of said bearing surface, said circular recess including an undercut portion having a diameter less than the diameter of said piercing edge, said undercut portion extending radially inwardly in an axial direction from said piercing edge to a point within said blank beyond the plane of said bearing surface, and a plurality of radial locking ribs in said recess extending inwardly from said bearing surface to a point short of said undercut portion, each rib including a flat top surface and a pair of side walls diverging therefrom towards the base of said recess.

2. A self-piercing and clinching nut according to claim 1, wherein the opposed side walls of any two adjacent ribs are spaced apart from one another throughout their depth to provide panel locking areas therebetween extending to the base of said recess.

3. A self-piercing and clinching nut according to claim 1, wherein, the lateral plane of said piercing edge is offset from the plane of said bearing surface a distance less than the thickness of the metal panel to which the nut is applied.

References Cited by the Examiner
UNITED STATES PATENTS

| | | |
|---|---|---|
| 521,825 | 6/1894 | Shipe. |
| 1,332,686 | 3/1920 | Reynolds. |
| 2,486,769 | 11/1949 | Watson _____ 151—41.73 |
| 2,707,322 | 5/1955 | Strain et al. _____ 151—41.73 |
| 2,749,606 | 6/1956 | Donahue _____ 29—432 |
| 2,750,660 | 6/1956 | Newcomb _____ 29—432 |
| 3,000,420 | 9/1961 | Spokes _____ 151—41.73 |

CARL W. TOMLIN, *Primary Examiner.*

EDWARD C. ALLEN, *Examiner.*

M. P. PARSON, Jr., *Assistant Examiner.*